(12) United States Patent
Stenberg

(10) Patent No.: US 12,234,915 B2
(45) Date of Patent: Feb. 25, 2025

(54) DAMPER ADJUSTING ARRANGEMENT

(71) Applicant: FUMEX AB, Skellefteå (SE)

(72) Inventor: Gustav Stenberg, Skellefteå (SE)

(73) Assignee: FUMEX AB, Skellefteå (SE)

( * ) Notice: Subject to any disclaimer, the term of this patent is extended or adjusted under 35 U.S.C. 154(b) by 161 days.

(21) Appl. No.: 17/598,881

(22) PCT Filed: Mar. 30, 2020

(86) PCT No.: PCT/SE2020/050324
§ 371 (c)(1),
(2) Date: Sep. 28, 2021

(87) PCT Pub. No.: WO2020/204791
PCT Pub. Date: Oct. 8, 2020

(65) Prior Publication Data
US 2022/0178449 A1    Jun. 9, 2022

(30) Foreign Application Priority Data

Mar. 29, 2019    (CN) .......................... 201920418258.1

(51) Int. Cl.
| | | |
|---|---|---|
| *F16K 1/22* | (2006.01) | |
| *B08B 15/00* | (2006.01) | |
| *F16K 31/53* | (2006.01) | |
| *F16K 31/60* | (2006.01) | |

(52) U.S. Cl.
CPC .............. *F16K 1/221* (2013.01); *B08B 15/00* (2013.01); *F16K 31/535* (2013.01); *F16K 31/60* (2013.01)

(58) Field of Classification Search
CPC ........ F16K 1/221; F16K 31/535; F16K 31/44; F24F 13/1426

USPC .......................................................... 251/230
See application file for complete search history.

(56) References Cited

U.S. PATENT DOCUMENTS

| | | | | |
|---|---|---|---|---|
| 4,785,190 A | * | 11/1988 | Frankena ............. | A61N 5/0614 |
| | | | | 248/242 |
| 5,096,156 A | | 3/1992 | Wylie et al. | |
| 7,407,337 B2 | * | 8/2008 | Tella ...................... | F16D 1/072 |
| | | | | 403/109.5 |

(Continued)

FOREIGN PATENT DOCUMENTS

| | | |
|---|---|---|
| CN | 304025313 S | 2/2017 |
| CN | 206247583 U | 6/2017 |
| EP | 1 881 278 A1 | 1/2008 |

OTHER PUBLICATIONS

English Machine Translation of CN206247583U (Year: 2017).*

(Continued)

*Primary Examiner* — Kenneth Rinehart
*Assistant Examiner* — Nicole Gardner
(74) *Attorney, Agent, or Firm* — MARSHALL, GERSTEIN & BORUN LLP

(57) ABSTRACT

A damper adjusting arrangement configured for regulating the flow of a gaseous fluid within a channel of an extractor tubing. The damper adjusting arrangement includes a damper member pivotably arranged in the channel and coupled to a rotary control means of the damper adjusting arrangement. A first member of the rotary control means includes a resilient element, which exhibits a plurality of radially protruding first bulges being configured for engagement with a second member of the rotary control means.

20 Claims, 5 Drawing Sheets

(56) References Cited

U.S. PATENT DOCUMENTS

| | | | |
|---|---|---|---|
| 8,156,612 B2 * | 4/2012 | Yamashita | A47C 1/026 403/93 |
| 10,928,095 B2 * | 2/2021 | Amirian | F16K 35/04 |
| 2006/0199525 A1 | 9/2006 | Marcoux et al. | |
| 2015/0147955 A1 | 5/2015 | Yoskowitz | |
| 2016/0193635 A1 | 7/2016 | Mate et al. | |
| 2018/0003408 A1 | 1/2018 | Davis et al. | |

OTHER PUBLICATIONS

First Examination Report, Indian Application No. 202147046790, dated Jul. 28, 2022.
Extended European Search Report, European Application No. 20784592.6, dated Nov. 11, 2022.
International Search Report and Written Opinion for PCT/SE2020/050324, mailed Jun. 16, 2020.

* cited by examiner

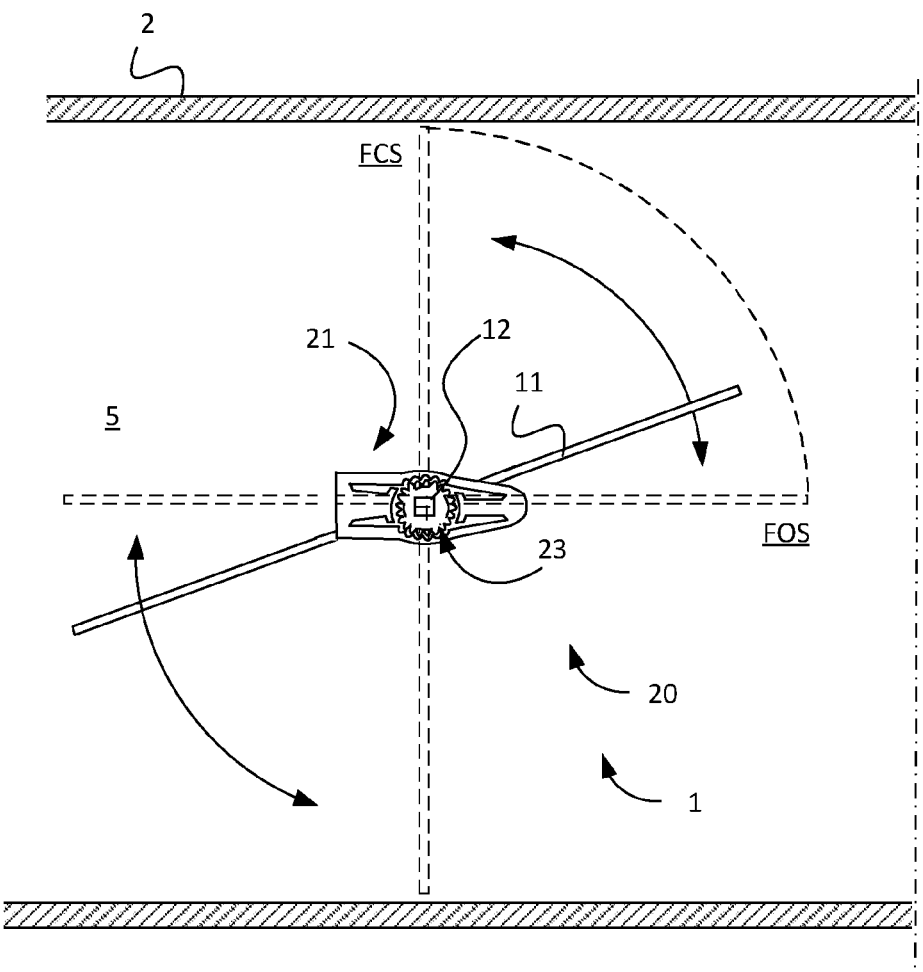
Fig. 6
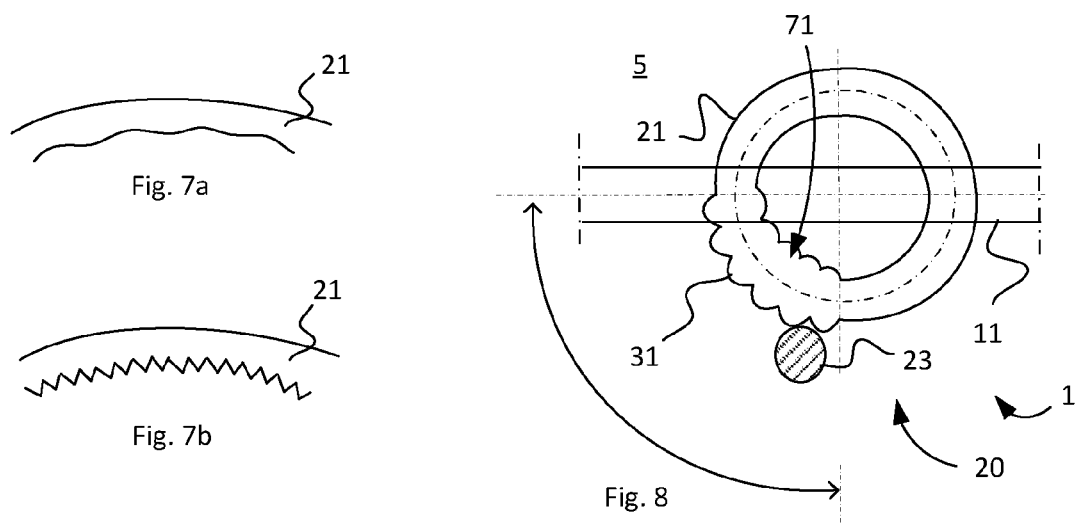
Fig. 7a
Fig. 7b
Fig. 8

DAMPER ADJUSTING ARRANGEMENT

TECHNICAL FIELD

The present invention relates to a damper adjusting arrangement configured for regulating the flow of a gaseous fluid within a channel of an extractor tubing.

The present invention may concern the industry manufacturing ventilation arrangements designed for capturing gases or may concern the industry using such damper adjusting arrangements.

The present invention may concern a damper adjusting arrangement that is configured to be mounted to a wide range of extraction apparatuses configured to capture e.g., welding fumes and dust at the source or work site. The captured gas may be smoke, welding fume, dusts, vapors or other gaseous fluid.

The present invention especially may concern the fume extractor manufacturing industry producing damper adjusting arrangements configured for high suction and high flow extraction performances.

The present invention especially may concern the industry making use of such damper adjusting arrangements.

In particular, the invention relates to a damper adjusting arrangement, wherein the dampening of the flow of gaseous fluid through the extractor tubing is possible to adjust in a rigid way and in a controlled manner.

BACKGROUND

In industrial environments an appropriate air exchange and/or ventilation is of utmost importance for environmental and processing reasons. Processes generating fumes or gases, which may cause health issues or interfere with the process at hand, must be handled with proper care to ensure that fumes or gases are disposed of in an efficient manner.

For some processes, the need to adjust the flow of gaseous fluids, guided by the channel of the extractor tubing of the ventilation arrangements, may be present. If only a small amount of gaseous fluid needs to be collected by the arrangement, it may be ineffective to extract the gaseous fluid at full effect.

One way to achieve less than full extraction of gaseous fluid is made by means of adjustable dampers provided to the channel of the extractor tubing, which dampers are operable and adjustable from outside.

Current adjustable dampers often use a disc shaped element or other suitable damper element arranged in the channel of the extractor tubing.

The disc shaped element is preferably coupled to a rotary shaft reachable exterior to the extractor tubing directly or indirectly via a handle. The operator rotates the handle for adjusting the angle of the disc shaped element relative the center line of the channel of the extractor tubing.

The shaft preferably extends through the wall of the extractor tubing on opposite sides to ensure a secure mounting of the shaft to the extractor tubing.

Repeated use of current adjustable dampers may impair the frictional forces of friction joints configured to keep the disc shaped element in an adjusted position relative the center line of the extractor tubing.

Over time, this may lead to even more wear, resulting in an impaired dampening effect.

High effect extractor tubing arrangements using adjustable dampers and adjustable dampers having large diameters may be subjected to high forces in harsh environment.

Adjustable dampers may be subjected to heat, oil, high under pressure, dirt, etc.

There is thus a need for an improved adjustable damper arrangement, which overcomes the drawbacks of prior art and provides a reliable and accurate dampening effect at the same time as the adjustable damper arrangement can be made with manufacturing cost.

Chinese design registration ZL 201630495253.0 (to Fumex AB) discloses an adjustable damper arrangement comprising a disc shaped element pivotably arranged in a channel of an extractor tubing and coupled to a handle arranged exterior the extractor tubing.

The handle is provided with a plurality of bulges protruding in an axial direction and arranged in a plane extending transverse to the axis of the channel in accordance with a certain pattern. The pattern engages a corresponding pattern of a base portion for forming a friction joint configured to keep the disc shaped element in the adjusted position relative to the center line of the extractor tubing.

The adjustable damper arrangement disclosed in ZL 201630495253.0 works well and is subject to development.

SUMMARY OF THE INVENTION

An object is to provide a damper adjusting arrangement, which comprises a rotary control means configured to regulate the flow of gaseous fluid in the channel of the extractor tubing in a reliable way.

An object is to provide a damper adjusting arrangement, which is robust, user friendly, cost-effective to manufacture and which may exhibit long-life and long-term mechanical performance.

A further object is to provide a damper adjusting arrangement, which is able to regulate the dampening effect in discrete steps.

An object is to provide a damper adjusting arrangement comprising a damper member, which may be rotated between a fully open state and a fully closed state in said channel of the extractor tubing.

There is an object to provide a robust damper adjusting arrangement configured for regulating a high-rate flow of gaseous fluid in the extractor tubing.

There is an object to provide a damper adjusting arrangement involving safety and comfort in regulating a high-rate flow of gaseous fluid in the extractor tubing.

An object of the present invention is to provide a damper adjusting arrangement, which overcomes drawbacks of prior art.

This or at least one of said objects has been solved by a damper adjusting arrangement configured for regulating the flow of a gaseous fluid within a channel of an extractor tubing, the damper adjusting arrangement comprises a damper member pivotably arranged in the channel and coupled to a rotary control means mounted to the damper adjusting arrangement. A first member of the rotary control means comprises a resilient element, which exhibits a plurality of radially protruding first bulges being configured for engagement with a second member of the rotary control means.

Alternatively, the resilient element comprises a plurality of radially and inwardly protruding first bulges.

Alternatively, the first member comprises a plurality of radially and inwardly protruding first bulges.

Alternatively, the second member comprises a plurality of radially and outwardly protruding second bulges.

Alternatively, the plurality of radially and inwardly protruding first bulges are configured for engagement with the plurality of radially and outwardly protruding second bulges.

Alternatively, the first member comprises a first leg connected to or integrally joined to a first and a second end portion of the first member.

Alternatively, the first member comprises a second leg connected to or integrally joined to the first and the second end portion of the first member.

Alternatively, the first end portion comprises a first through hole and/or the second end portion comprises a second through hole.

Alternatively, the resilient element comprises said first and second legs.

Alternatively, the first member is formed as an elongated washer-like planar tongue comprising a central open area, configured to encompass the second member, and having the first and the second leg connected to the first and to the second end portion, wherein the first and second leg each comprises a plurality of inwardly facing bulges forming a wave-shaped pattern.

Alternatively, an imaginary central axis extends through the central open area and extends perpendicular to the plane of the elongated washer-like planar tongue.

Alternatively, the first member comprises a plurality of radially first bulges, protruding inwardly towards an imaginary central axis, about which the damper member is pivotable.

Alternatively, the first leg comprises a first flexible portion and a second flexible portion, wherein a first plurality of said first bulges are positioned between the first flexible portion and the second flexible portion and being configured to engage the second member.

Alternatively, the second leg comprises a third flexible portion and a fourth flexible portion, wherein a second plurality of said first bulges are positioned between the third flexible portion and the fourth flexible portion and are configured to engage the second member.

Alternatively, the first and/or second and/or third and/or fourth flexible portions exhibit various thicknesses and/or widths.

Alternatively, the first and/or second and/or third and/or fourth flexible portions exhibit a first width and a second width, wherein the first width is wider than the second width, for providing a flexibility and/or a resilience of the resilient element.

Alternatively, the first member comprises steel (e.g., high-strength steel or hardened steel or other suitable composition of steel).

In turn, upon rotation of the second member, as the second bulges are positioned at the circumference and outermost edge of the second member, a distinct frictional force holding the first bulge (in a second recess formed between two adjacent second bulges) is defined by the perpendicular distance between the axis center and the line of action of the force acting on the second bulge.

In this way a robust and long-life damper adjusting arrangement is achieved.

Alternatively, the first member is entirely made of resilient material.

Alternatively, the first member is formed as an elongated washer-like planar tongue with an open area and having a first and second leg connected to a first and a second end portion, wherein the first and second leg each comprises a plurality of inwardly facing bulges forming a wave-shaped pattern.

In such way, the first member can be manufactured as a sheet metal pressed component, wherein the damper adjusting arrangement can be produced cost-effectively.

Alternatively, the second member is positioned between and in contact with the first and second leg.

Alternatively, each first and second leg may be formed as a rod or strip and may be integrated parts of the first member.

Alternatively, the first member may be of generally elongated configuration or any other appropriate configuration.

Alternatively, the respective first and second leg being configured to be spring-biased against the second member.

Due to the sliding contact between the first and second bulge, enhanced friction can be achieved by the spring-biased engagement in a robust way.

Alternatively, the second member is configured as a wheel, a ring- or disc-shaped body or other circular body configured to be able to be rotated together with the axis, when the first and second leg spring in a direction away from the second member and the plurality of first bulges ride over the engaged second bulges of the second member.

Alternatively, the first bulges are formed along at least one imaginary arc.

Alternatively, the imaginary arc is defined by an imaginary circle, the center of which corresponds with a rotary axis of the second member.

Alternatively, the first member of the rotary control means comprises a resilient washer or washer-like resilient member having a plurality of inwardly and in radial direction protruding bulges.

Alternatively, the resilient washer or washer-like resilient member comprises high-strength steel or high-strength low-alloy steel or stainless steel.

Alternatively, the plurality of inwardly and radially protruding first bulges are formed along at least one imaginary circular arc defined by the radius between the perimeter and the rotary axis the second member.

Alternatively, the plurality of inwardly and radially protruding first bulges are formed along two opposite arranged imaginary circular arcs of the first member.

Alternatively, the imaginary circular arc is formed by a well-defined sector of an imaginary circle, the center of which corresponds with a rotary axis of the second member.

Alternatively, the plurality of outwardly and radially protruding second bulges are formed around an outer periphery of the second member, wherein the plurality of bulges forms a wave-shaped pattern.

Alternatively, the second member comprises a non-resilient engagement portion configured to be engaged with the first member and configured to be rotatably arranged and coupled to the damper member for providing a rotary motion thereof.

Alternatively, the resilient element of the first member exhibits a higher degree of resilience than that of the second member.

Alternatively, the second member comprises a plurality of outwardly and radially protruding bulges, the geometry of which corresponds with the geometry of the inwardly protruding bulges of the first member.

Alternatively, a handle member is coupled to the damper member via the second member, which handle member is rotatably arranged exterior the extractor tubing for providing a rotary motion of the second member.

Alternatively, the handle member is coupled to the damper member via a shaft comprising the second member.

Alternatively, the engagement portion of second member is configured to be engaged with the first member and is configured to be rotatably arranged and coupled to the damper member for providing a rotary motion thereof, when the handle member is rotated.

Alternatively, the second member comprises a wheel-formed or rim-shaped member comprising the plurality of outwardly and radially protruding bulges, which bulges are arranged along the circumferential direction thereof.

Alternatively, the first member of the rotary control means is configured to be rotatably arranged and coupled to the damper member for providing a rotary motion thereof.

Alternatively, the first member of the rotary control means comprises a resilient rim-like member having a plurality of outwardly and radially protruding bulges.

Alternatively, the second member comprises a non-resilient engagement means configured to engage the plurality of outwardly and radially protruding bulges of the resilient rim-like member of the first member.

Alternatively, the damper adjusting arrangement is configured to be mounted to an extractor tubing having a significant diameter.

Alternatively, the respective first bulge may be considered as a pawl-like element spring-biased into engagement with a second recess.

The respective bulge may be defined as a bulge, a swelling, a bump, a protrusion, a tooth, a projection, etc.

The respective recess may be defined as a depression, a cavity, a depth, an indentation, a slot, etc.

The respective first bulges may be arranged adjacent each other about an inner broken circumference of the resilient element.

The respective second bulges may be arranged adjacent each other about an outer circumference of the non-resilient element.

The respective first bulge may be configured to spring away from and ride over an engaging corresponding second bulge, for subsequent drop down into a second recess of the second member, wherein the resilient element is in a spring back position and holds the second member in position.

The rotary control means may comprise the axis, the first and second member and a handle member coupled to the axis,

BRIEF DESCRIPTION OF THE DRAWINGS

The present invention will now be described by way of examples with references to the accompanying schematic drawings, of which:

FIG. 6 illustrates a damper adjusting arrangement according to a sixth example;

FIGS. 7a-7b illustrate different types of inwardly facing bulges;

FIG. 8 illustrates an extractor tubing comprising a damper adjusting arrangement according to a seventh example;

DETAILED DESCRIPTION

Hereinafter, exemplary embodiments of the present invention are described with reference to the accompanying figures, wherein for the sake of clarity and understanding of the invention some details of no importance may be deleted from the drawings.

Figure 1:
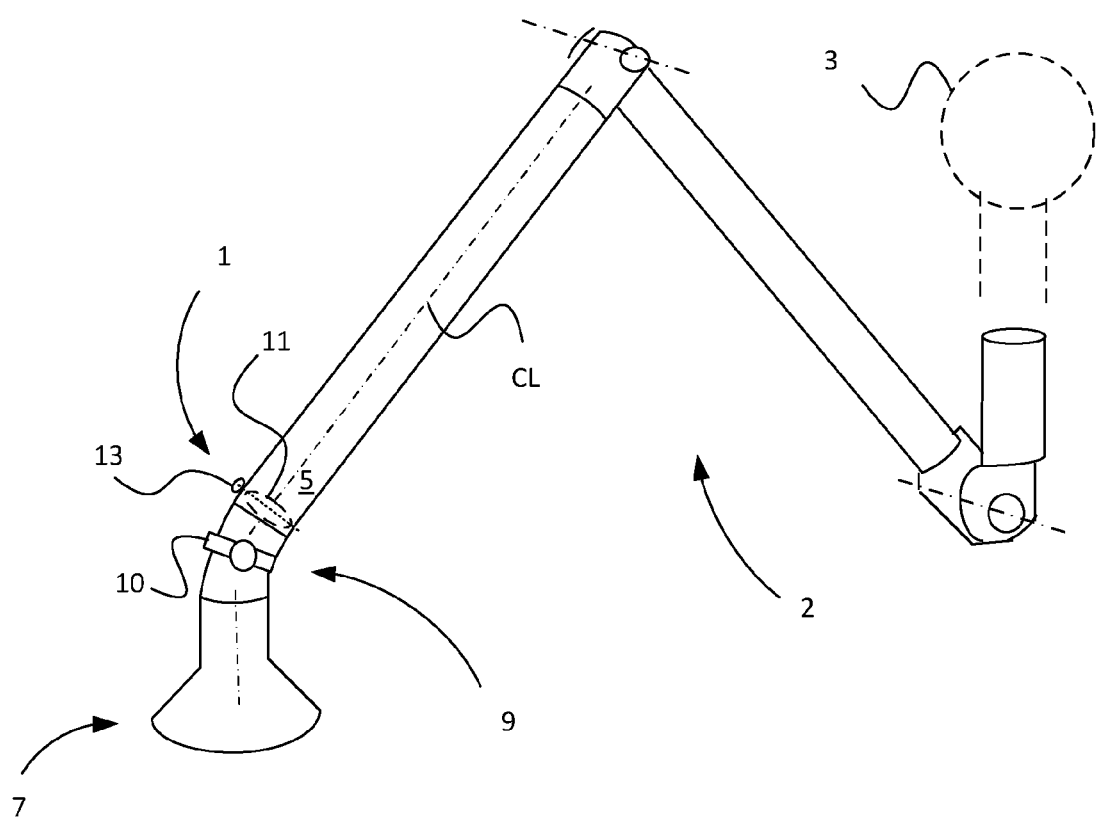
FIG. 1 illustrates an extractor tubing comprising a damper adjusting arrangement according to a first example.

FIG. 1 illustrates an extractor tubing 2 comprising a damper adjusting arrangement 1 according to a first example. The extractor tubing 2 is designed for source capturing different gases and dust in a worksite. A suction fan 3 is coupled to a channel 5 of the extractor tubing 2 at a first end. A hood 7 is mounted to the extractor tubing 2 at a second end. An adjustable tubing joint 9 comprises a pivot mechanism 10 such that the hood 7 can be pivoted in three-dimensions. The damper adjusting arrangement 1 comprises a disc shaped element 11 mounted in the channel 5 and configured to be adjustable between a fully open state or a fully closed state or rotated into a holding position there between.

The damper adjusting arrangement 1 is held in the adjusted position by means of frictional forces of a friction joint between a first and second member (not shown) to keep the disc shaped element 11 in the adjusted position relative to the center line CL of the channel 5.

An operator (not shown) can easily turn a knob 13 coupled to the disc shaped element 11 via the friction joint for adjusting the disc shaped element 11 and regulating the flow of gaseous fluid.

It is extremely important that the friction joint be rigidly configured, as high-rate gaseous fluid flow in the channel 5, which also may have a large diameter, requires robust damper adjusting arrangements.

The features of the friction joint between the first and second member will be further described by examples below.

Figure 2:
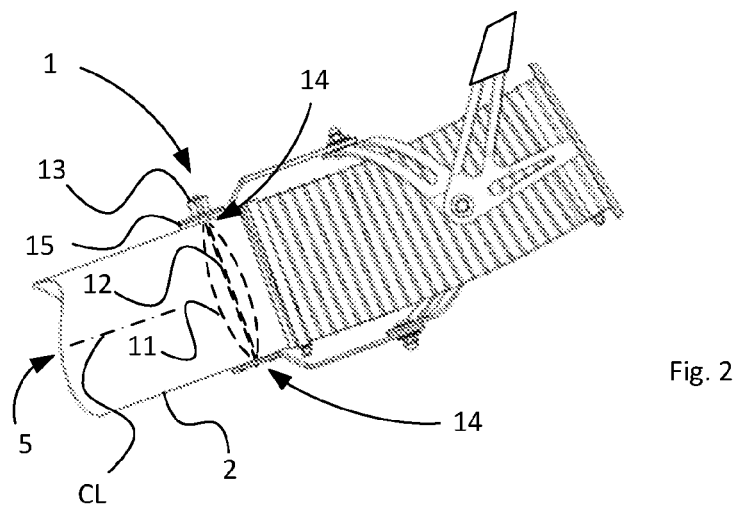
FIG. 2 illustrates an extractor tubing comprising a damper adjusting arrangement according to a second example.

FIG. 2 illustrates an extractor tubing 2 comprising a damper adjusting arrangement 1 according to a second example. The damper adjusting arrangement 1 comprises a disc shaped element 11 rotatably arranged in a channel 5 of the extractor tubing 2.

The damper adjusting arrangement 1 is configured for regulating the flow of a gaseous fluid within the channel 5. The disc shaped element 11 is pivotably arranged together with a shaft 12 extending transversely to a center line CL of the channel 5.

A knob 13 is positioned on an exterior portion of the extractor tubing 2 and coupled to the shaft 12 for rotating the disc shaped element 11. The shaft 12 is supported at each end by a respective bearing 14 arranged in the wall of the extractor tubing 2.

A rotary control mechanism 15 of the damper adjusting arrangement 1 is arranged exterior to the extractor tubing 2 wall.

A first member (not shown) of the rotary control mechanism 15 comprises a resilient element (not shown), which exhibits a plurality of inward and radially protruding first bulges being configured for engagement with a second member (not shown) of the rotary control means 15.

The inwardly and radially protruding bulges are configured to engage a plurality of outwardly and radially protruding second bulges of a non-resilient second member.

The second member is configured to be rotatably arranged and coupled to the damper member for providing a rotary motion of the damper member (the disc shaped element 11).

The geometry of the first bulges may correspond with the geometry of the second bulges.

An operator (not shown) will rotate the knob 13 under influence of the rotary control mechanism 15, wherein the first bulges of the resilient element are configured to spring away from the second bulges, when rotating the second member, thereby generating a frictional force between the first and second member.

A first recess is positioned between two first bulges.

A second recess is positioned between two second bulges.

When a second bulge or second bulges is/are positioned in the first recess or in the respective first recess, the resilient element is in a spring back position and holds the second member in position. In this way, the operator can adjust the damper member to a desired position (held in position by the resilient member).

For example, if the operator wants to set a full flow of gaseous fluid through the channel 5, the operator simply turns the knob 13 to a "fully open" mark (not shown).

For example, if the operator wants to set the flow of gaseous fluid through the extractor tubing 2 to an "idle position" or the fully closed position, he simply turns the knob 13 to a "closed" mark (not shown).

The first bulge is spring-biased into engagement with a second recess.

Due to the sliding contact between the first and second bulge, enhanced friction can be achieved by the spring-biased engagement in a robust way.

Figure 3:
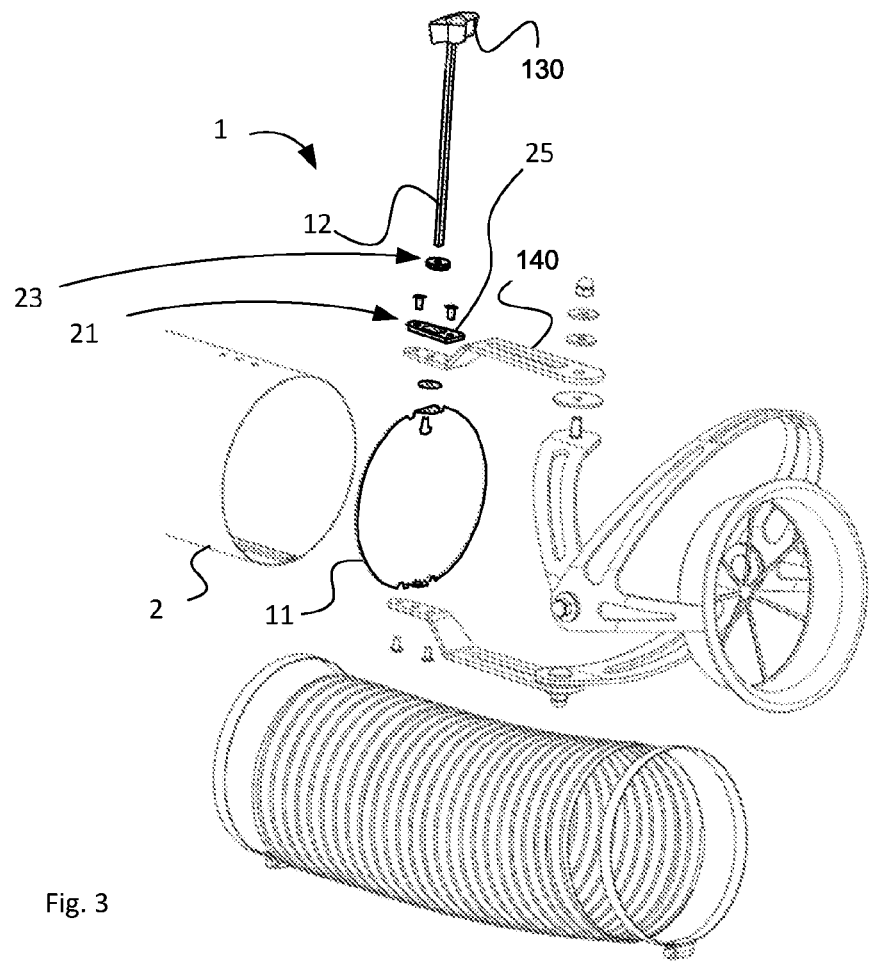
FIG. 3 illustrates a damper adjusting arrangement according to a third example.

FIG. 3 illustrates an exploded view of a damper adjusting arrangement 1 according to a third example. The damper adjusting arrangement 1 is configured for regulating the flow of a gaseous fluid within a channel 5 of extractor tubing 2. The damper adjusting arrangement 1 comprises a disc-shaped damper 11 rigidly coupled to a shaft 12 having a square cross-section. The shaft 12 is in turn rigidly coupled to a handle 130. An operator (not shown) turns the handle 130 for rotating the disc-shaped damper 11. A bracket arm 140 configured to hold a pivot mechanism is attached to the extractor tubing 2.

A first member 21 may be attached to the extractor tubing 2 (e.g., via the bracket arm 14).

The first member 21 of the damper adjusting arrangement 1 comprises a resilient washer 25, which exhibits a plurality of inwardly protruding first bulges (not shown) being configured for engagement with a second member 23 being rigidly coupled to the shaft 12. The second member 23 comprises a plurality of outwardly protruding second bulges (not shown) configured for engagement with said first bulges.

A respective recess is positioned between two adjacent bulges and when a respective second bulge is moved into a recess between adjacent first bulges, a portion of the resilient washer carrying the first bulges will spring back and hold the second member 23 in position. In this way, the operator can rotate the disc-shaped damper 11 into a desired position (and the disc-shaped damper 11 is thus held in position by the spring back effect of the resilient member).

Figure 4:
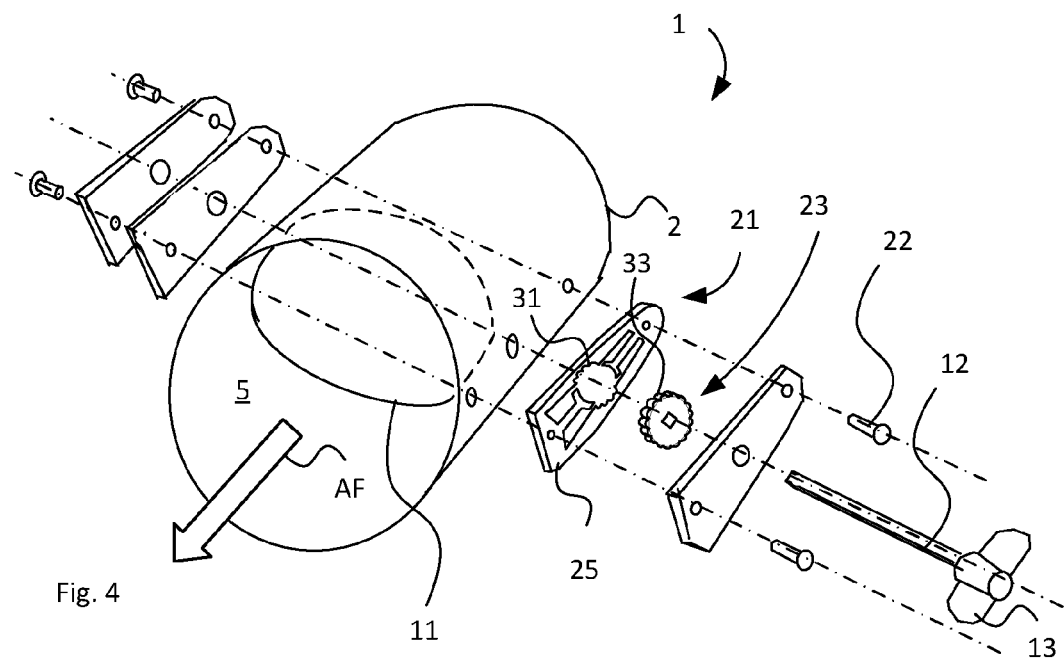
FIG. 4 illustrates a damper adjusting arrangement according to a fourth example.

FIG. 4 illustrates a damper adjusting arrangement 1 according to a fourth example. The damper adjusting arrangement 1 is configured for regulating the flow of a gaseous fluid AF within a channel 5 of an extractor tubing 2.

The damper adjusting arrangement 1 comprises a disc-shaped damper 11 rigidly coupled to a shaft 12 having a square cross-section. The shaft 12 is rotatably arranged about an axis extending transverse the center line of the channel 5 and is rigidly coupled to a knob 13 or wing nut. An operator (not shown) turns the knob 13 for rotating the disc-shaped damper 11 for regulating the flow of a gaseous fluid AF.

A first member 21 may be attached to the extractor tubing 2 by means of rivets 22. The first member 21 of the damper adjusting arrangement 1 comprises a resilient washer 25, which exhibits a plurality of inwardly protruding first bulges 31 being configured for engagement with second bulges 33 of a second member 23 (e.g., a non-resilient engagement wheel or other circular body) rigidly coupled to the shaft 12.

The plurality of outwardly protruding second bulges 33 are configured for engagement with said first bulges 31.

The first and second bulges 31, 33 have a common width, wherein at least the first bulge 31 and the second bulge 33 are arranged to interact with each other to provide a discrete stepped control of the rotation of the second member 23, wherein one discrete step corresponds to the width of the respective first 31 and second 33 bulge.

The second member coupled to the disc shaped element 11 and to the knob 13 can thus be rotated in discrete steps, which makes the damper adjusting arrangement 1 easy to use in a controlled way.

Figure 5A:
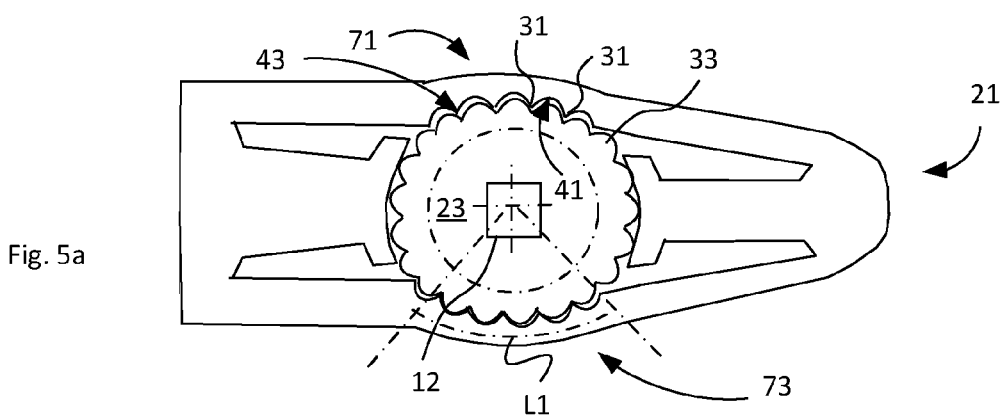
FIGS. 5a and 5b illustrate a first and second member of a damper adjusting arrangement according to a fifth example.
Figure 5B:
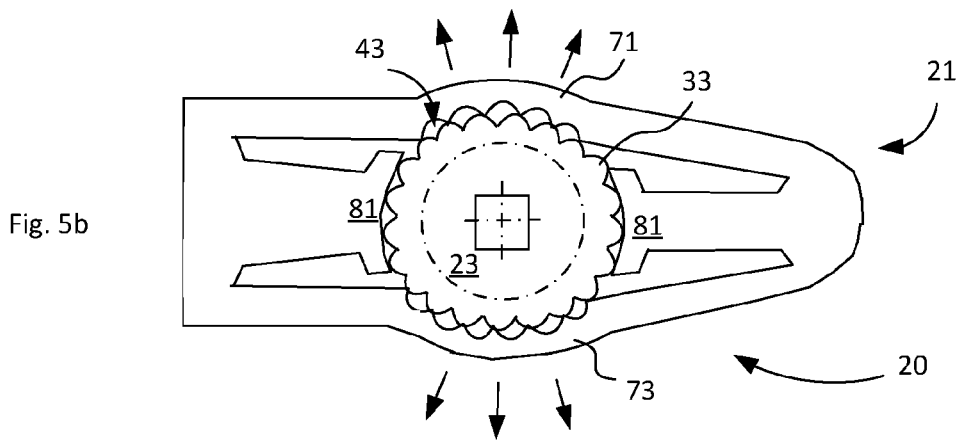

FIGS. 5a and 5b illustrate first 21 and second 23 members of a damper adjusting arrangement according to a fifth example. The first member 21 comprises a washer-like flat element having a central portion occupied by the second member 23.

The washer-like flat element may be made of high-strength steel and may comprise a first 71 and a second 73 resilient portion, having inwardly protruding first bulges 31, positioned at opposite sides and on both sides of the second member 23.

The second member 23 is configured as a wheel-like rotary part having the second bulges 33 that protrude outward and are configured to engage the first bulges 31 of the first member 21. A rotary shaft 12 is coupled to the second member 23.

The first 21 and second 23 members and a handle or knob (not shown), and the rotary shaft may constitute a rotary control means 20 (damper adjustment mechanism).

The pattern and design of the first 31 and second 33 bulges may be of any suitable shape for reaching a robust and reliable rotary control means 20. The respective bulge may be defined as a swelling, a bump, a protrusion, a tooth, a projection, etc.

However, for example, a smooth, wave-like shape may be used for forming the bulges and recesses.

A first recess 41 is positioned between two first bulges 31. A second recess 43 is positioned between two second bulges 33. The respective recess may be defined as a depression, a cavity, a depth, an indentation, a slot, etc.

The respective first bulge 31 of the respective first 71 and the second 73 resilient portions may be configured to spring away from the second member 23 (as shown in FIG. 5b) when riding over a corresponding second bulge 33 (during rotation of the second member 23), for subsequent drop down into the second recess 43 of the second member 23, wherein the respective first 71 and the second 73 resilient portions spring back for holding the second member 23 in position. The disc shaped element (not shown) coupled to the second member 23 will thus be held in position for regulating the flow of gaseous fluid in the channel (not shown).

The first bulges 31 are formed along at least one imaginary arc L1, which may follow an imaginary circle, the center of which corresponds with the axis of the second member 23.

Reference characters 81 in FIG. 5b mark a pair of guide arms configured to guide the first member 21 in proper position relative to the second member 23.

FIG. 6 illustrates a damper adjusting arrangement 1 comprising a rotary control means 20 according to a sixth example. The damper adjusting arrangement 1 is configured for regulating the flow of a gaseous fluid within a channel 5 of extractor tubing 2. The damper adjusting arrangement 1 comprises a disc-shaped damper 11 rigidly coupled to a shaft 12 and to a handle (not shown).

First 21 and second 23 members and the handle and shaft 12 may constitute the rotary control means 20.

The disc-shaped damper 11 is configured to be rotated by means of the shaft 12 in incremental steps between a fully open state FOS and a fully closed state FCS in said channel 5 of the extractor tubing 2.

FIGS. 7a-7b illustrate different types of inwardly facing bulges of a first member 21 forming a wave-shaped pattern protruding inwardly toward a second member (not shown).

FIG. 8 illustrates an extractor tubing comprising a damper adjusting arrangement 1 according to a seventh example. The damper adjusting arrangement 1 is configured for regulating the flow of a gaseous fluid within a channel 5 of extractor tubing (not shown). The damper adjusting arrangement 1 comprises a damper member 11, which is pivotably arranged in the channel 5 and coupled to a rotary control means 20 mounted to the damper adjusting arrangement 1. A first member 21 of the rotary control means 20 comprises a resilient element 71, which exhibits a plurality of radially outwardly protruding first bulges 31 being configured for engagement with a second member 23 of the rotary control means 20.

Figure 9:
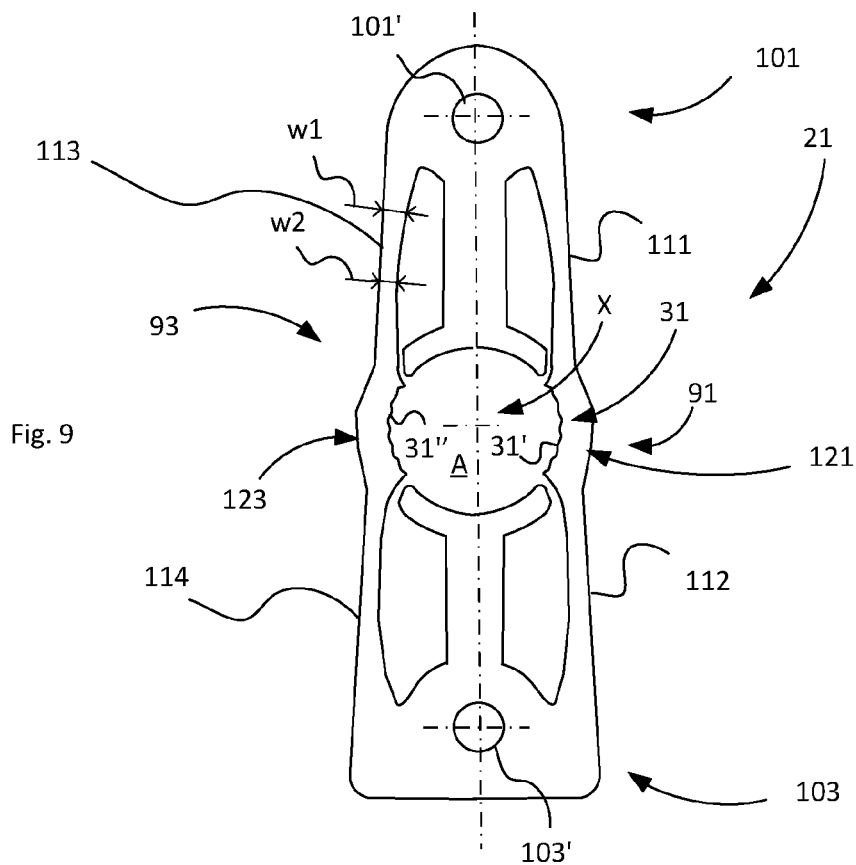
FIG. 9 illustrates an exemplary first member of a damper adjusting arrangement according to an eight example.

FIG. 9 illustrates an exemplary first member 21 of a damper adjusting arrangement according to an eight example.

The first member 21 may be formed as an elongated washer-like planar tongue with a centrally positioned open area A. The first member 21 may have first 91 and second 93 legs connected to first 101 and a second 103 end portions of the first member 21. The first and second legs 91, 93 each comprises a plurality of inwardly facing first bulges 31 forming a wave-shaped pattern. The first member can be manufactured as a sheet metal pressed component.

Alternatively, an imaginary central axis X extends through the central open area A and extends perpendicular to the plane of the elongated washer-like planar tongue.

Alternatively, the first member 21 comprises the first leg 91 connected to or integrally joined to the first 101 and to the second 103 end portions of the first member 21.

Alternatively, the first member 21 comprises the second leg 93 connected to or integrally joined to the first 101 and the second 103 end portions of the first member.

Alternatively, the first end portion 101 comprises a first through hole 101' and the second end portion 103 comprises a second through hole 103'.

Figure 10:
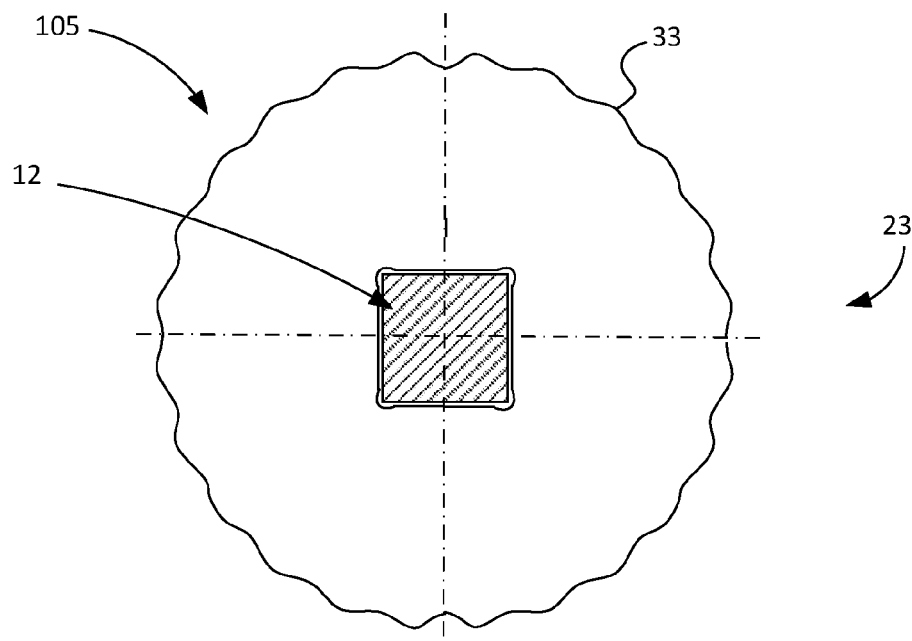
FIG. 10 illustrates an exemplary second member of a damper adjusting arrangement according to a ninth example.

The central open area A is configured to encompass the second member (shown in FIG. 10).

Alternatively, the first leg 91 comprises a first flexible portion 111 and a second 112 flexible portion, wherein a first plurality 31' of said first bulges of a first intermediate portion 121 of the first leg 91 is positioned between the first flexible portion 111 and the second flexible portion 112 and are configured to engage the second member.

Alternatively, the second leg 93 comprises a third flexible portion 113 and a fourth flexible portion 114, wherein a second plurality 31" of said first bulges a second intermediate portion 123 of the second leg 93 are positioned between the third flexible portion 113 and the fourth flexible portion 114 and are configured to engage the second member.

The first, second, third and fourth flexible portions 111, 112, 113, 114 exhibit various thickness and/or width, wherein a first width w1 is wider than a second width w2, for providing a flexibility and/or a resilience of the resilient element.

FIG. 10 illustrates an exemplary second member 23 of a damper adjusting arrangement according to a ninth example. A square shaped through-hole is provided for a shaft 12 coupled to a disc-shaped plate rotatable in a channel (not shown) of an extractor tubing and coupled to a handle or knob.

The perimeter of an outwardly facing edge area 105 of the second member 23 is oriented co-axial with the shaft 12 and is provided with outwardly and radially protruding second bulges 33.

The present invention is of course not in any way restricted to the preferred examples described above, but many possibilities to modifications, or combinations of the described examples thereof, should be apparent to a person with ordinary skill in the art without departing from the basic idea of the invention as defined in the appended claims.

The invention claimed is:

1. A damper adjusting arrangement configured for regulating the flow of a gaseous fluid within a channel of an extractor tubing, the damper adjusting arrangement comprising: a damper member pivotably arranged in the channel and coupled to a rotary control means of the damper adjusting arrangement, wherein a first member of the rotary control means comprises a resilient element, which exhibits a plurality of radially and inwardly protruding first bulges being configured for engagement with a plurality of second bulges extending radially from an outermost perimeter surface of a second member of the rotary control means, wherein the first member further comprises a first leg and a second leg, and wherein the second member is positioned between and in contact with the first leg and the second leg of the first member.

2. The damper adjusting arrangement according to claim 1, wherein the first member comprises steel.

3. The damper adjusting arrangement according to claim 1, wherein the first bulges are formed along at least one imaginary circular arc defined by the radius of the second member.

4. The damper adjusting arrangement according to claim 3, wherein the first member comprises steel.

5. The damper adjusting arrangement according to claim 1, wherein the first bulges form a wave-shaped pattern.

6. The damper adjusting arrangement according to claim 1, wherein the first leg comprises a first resilient leg and the second leg comprises a second resilient leg opposite the first resilient leg, the first resilient leg engaged with a first portion of the second member.

7. The damper adjusting arrangement according to claim 1, wherein the outermost perimeter surface comprises a curved surface.

8. The damper adjusting arrangement according to claim 7, wherein the first member comprises steel.

9. The damper adjusting arrangement according to claim 8, wherein the first bulges are formed along at least one imaginary circular arc defined by the radius of the second member.

10. The damper adjusting arrangement according to claim 7, wherein the first bulges are formed along at least one imaginary circular arc defined by the radius of the second member.

11. The damper adjusting arrangement according to claim 7, wherein the first bulges form a wave-shaped pattern.

12. The damper adjusting arrangement according to claim 7, wherein the first leg comprises a first resilient leg and the second leg comprises a second resilient leg opposite the first resilient leg, the first resilient leg engaged with a first portion of the second member.

13. The damper adjusting arrangement according to claim 1, wherein the first member further comprises a first arm at a first end and a second arm at a second end opposite the first end, the first arm and the second arm extending inwards from the first end and second end, respectively, wherein each of the first and second arms is disposed between the first and second legs.

14. The damper adjusting arrangement according to claim 13, wherein the first arm comprises a first engaging portion that is in contact with the second member.

15. The damper adjusting arrangement according to claim 14, wherein the second arm further comprises a second engaging portion that is in contact with the second member.

16. The damper adjusting arrangement according to claim 1, wherein the second member biases the first and second legs outward when the second member is rotated relative to the first member.

17. A damper adjusting arrangement configured for regulating the flow of a gaseous fluid within a channel of an extractor tubing, the damper adjusting arrangement comprising: a damper member pivotably arranged in the channel; and a rotary control means of coupled to the damper member, wherein a first member of the rotary control means comprises a resilient element, which exhibits a plurality of radially and inwardly protruding first bulges, the first member comprising a plurality of first recesses defined between the plurality of first bulges, respectively, the plurality of first recesses engaged with and radially circumventing a plurality of radially and outwardly protruding second bulges of a second member of the rotary control means, wherein the first member further comprises a first leg and a second leg, and wherein the first and second legs of the first member are configured to be biased against the second member.

18. The damper adjusting arrangement according to claim 17, wherein the first bulges are formed along at least one imaginary circular arc defined by the radius of the second member.

19. The damper adjusting arrangement according to claim 17, wherein the first member further comprises a first arm at a first end and a second arm at a second end opposite the first end, the first arm and the second arm extending inwards from the first end and second end, respectively, wherein each of the first and second arms is disposed between the first and second legs.

20. The damper adjusting arrangement according to claim 9, wherein the first arm further comprises a first engaging portion that is in contact with a first portion of the second member, and wherein the second arm further comprises a second engaging portion that is in contact with a second portion of the second member.

\* \* \* \* \*